(12) United States Patent
Hoeber et al.

(10) Patent No.: US 7,752,243 B2
(45) Date of Patent: Jul. 6, 2010

(54) METHOD AND APPARATUS FOR CONSTRUCTION AND USE OF CONCEPT KNOWLEDGE BASE

(75) Inventors: Orland Harold Hoeber, Regina (CA); Xue-Dong Yang, Regina (CA); Yiyu Yao, Regina (CA)

(73) Assignee: University of Regina, Saskatchewan (CA)

( * ) Notice: Subject to any disclaimer, the term of this patent is extended or adjusted under 35 U.S.C. 154(b) by 342 days.

(21) Appl. No.: 11/447,797

(22) Filed: Jun. 6, 2006

(65) Prior Publication Data

US 2007/0282826 A1    Dec. 6, 2007

(51) Int. Cl.
*G06F 17/30* (2006.01)
*G06F 17/00* (2006.01)

(52) U.S. Cl. .............. 707/999.005; 707/706; 707/707; 707/708; 707/713; 707/736

(58) Field of Classification Search ........... None
See application file for complete search history.

(56) References Cited

U.S. PATENT DOCUMENTS

| | | | |
|---|---|---|---|
| 5,634,051 A | | 5/1997 | Thomson |
| 5,768,578 A | * | 6/1998 | Kirk et al. ............... 707/100 |
| 6,038,560 A | * | 3/2000 | Wical ...................... 707/5 |
| 6,070,176 A | | 5/2000 | Downs et al. |
| 6,101,503 A | * | 8/2000 | Cooper et al. ............ 1/1 |
| 6,154,213 A | * | 11/2000 | Rennison et al. .......... 715/854 |
| 6,363,377 B1 | | 3/2002 | Kravets et al. |
| 6,523,026 B1 | | 2/2003 | Gillis |
| 6,601,061 B1 | * | 7/2003 | Holt et al. ................ 1/1 |
| 6,711,585 B1 | | 3/2004 | Copperman et al. |
| 6,721,729 B2 | | 4/2004 | Nguyen et al. |
| 6,742,003 B2 | | 5/2004 | Heckerman et al. |
| 6,895,406 B2 | | 5/2005 | Fables et al. |
| 6,961,731 B2 | * | 11/2005 | Holbrook ................. 1/1 |

(Continued)

FOREIGN PATENT DOCUMENTS

WO    WO-0177883 A1    10/2001

(Continued)

OTHER PUBLICATIONS

Mag. Andreas Neumann, Thematic Navigation in Space and Time, 2005.*

(Continued)

*Primary Examiner*—Yicun Wu
*Assistant Examiner*—Yu Zhao
(74) *Attorney, Agent, or Firm*—King & Schickli, PLLC

(57) ABSTRACT

A data structure, apparatuses and methods for expanding a search query to be used by a web search engine is provided. The search query is expanded by accessing a concept knowledge base data structure having concept data objects and term data objects with each term data object defining a term and associated with at least one of the concept data objects. Search terms making up the search query are matched to term data objects and a concept set is generated containing concept data objects associated with the term data objects. A second set of term data objects are generated by using the concept data objects to locate term data objects associated with the concept data objects. A user can then select one of the term data objects in the second set to expand the user's search query.

24 Claims, 10 Drawing Sheets

U.S. PATENT DOCUMENTS

| | | | |
|---|---|---|---|
| 7,181,438 B1 | 2/2007 | Szabo | |
| 7,249,117 B2 | 7/2007 | Estes | |
| 7,296,021 B2 | 11/2007 | Malkin et al. | |
| 7,401,087 B2 | 7/2008 | Copperman et al. | |
| 2002/0023077 A1 | 2/2002 | Nguyen et al. | |
| 2002/0042793 A1 | 4/2002 | Choi | |
| 2002/0052894 A1* | 5/2002 | Bourdoncle et al. | 707/513 |
| 2002/0107840 A1* | 8/2002 | Rishe | 707/3 |
| 2003/0061028 A1* | 3/2003 | Dey et al. | 704/9 |
| 2003/0177111 A1 | 9/2003 | Egendorf et al. | |
| 2004/0122656 A1 | 6/2004 | Abir | |
| 2004/0215599 A1 | 10/2004 | Apps et al. | |
| 2004/0220944 A1* | 11/2004 | Behrens et al. | 707/100 |
| 2004/0267774 A1 | 12/2004 | Lin et al. | |
| 2005/0165766 A1 | 7/2005 | Szabo | |
| 2006/0047663 A1 | 3/2006 | Rail | |
| 2006/0167930 A1 | 7/2006 | Witwer et al. | |
| 2006/0288023 A1 | 12/2006 | Szabo | |
| 2007/0073533 A1 | 3/2007 | Thione et al. | |
| 2007/0073748 A1 | 3/2007 | Barney | |
| 2007/0078848 A1 | 4/2007 | Sareen et al. | |
| 2007/0203693 A1 | 8/2007 | Estes | |
| 2007/0214131 A1 | 9/2007 | Cucerzan et al. | |
| 2007/0214154 A1 | 9/2007 | Ducatel et al. | |
| 2008/0140616 A1 | 6/2008 | Encina et al. | |

FOREIGN PATENT DOCUMENTS

| | | |
|---|---|---|
| WO | WO-0248921 A1 | 6/2002 |

OTHER PUBLICATIONS

Hsiao-Tieh Pu—A comparative analysis of web image and textual queries, Online Informational Review, 2005, vol. 29, No. 5, UK.

Valez, B.; Valiente, J.E.-Interactive query hierarchy generation . . . , Proceedings of the IASTED International Conference Internet and Multimedia . . . , 2001, pp. iv + 468.

Lee, Young_Jin, VisSearch: A collaborative Web searching environment, Comput Educ, May 2005, vol. 44, No. 4.

Granitzer, M. et al, WebRat: supporting agile knowledge retrieval through dynamic . . . , Proceedings of the Twelvth IEEE . . . , 2003, pp. xvii+ 408.

* cited by examiner

METHOD AND APPARATUS FOR CONSTRUCTION AND USE OF CONCEPT KNOWLEDGE BASE

This invention is in the field of search techniques used for search engines for the World Wide Web and more specifically methods and systems for refining search queries to be used to query the search engines.

BACKGROUND

The World Wide Web has given computer users on the Internet access to vast amounts of information in the form of billions of Web pages. Each of these pages can be accessed directly by a user typing the IP address or URL (universal resource locator) of a web page into a web browser on the user's computer, but often, a person is more likely to access a website by finding it with the use of a search engine. A search engine allows a user to input a search query made up of words or terms that a user thinks will be used in the web pages containing the information he or she is looking for. The search engine will attempt to match web pages to the terms in the search query and will then return the located web pages to the user. Typically, search engines return the results of the search as a list of the titles of the located Web pages, a short summary of each page, and the URL of the page. A user can then select one of the titles to view the web page.

With the continued growth of web pages available on the Internet making the task of search engines more and more difficult, web search engines have greatly increased the size of their indexes and made significant advances in the algorithms used to match a user's query to these indexes. This has allowed these search engines to perform very well when high quality queries are provided by users. High quality queries are typically queries that are quite specific and made up of terms and phrases that are commonly used in the relevant documents. High quality search queries can often result in a user being provided with many highly relevant documents in the first few pages of search results provided by the search engine.

One of the difficulties in using web search engines is in creating a high quality query. If users do not craft the queries properly, either by not being specific enough or using phrases and/or terms that do not commonly occur in the relevant documents, the query may not adequately capture the intention of the user and result in the web search engine returning results that are not very relevant to what the user is looking for. In some cases numerous matching documents may be returned, making it hard for a user to determine which of the many documents are relevant. In other cases, where too many keywords are used, few if any documents may be returned. Alternatively, a few relevant documents may be returned but they may be mixed with a relatively large number of non-relevant documents making finding these relevant documents time consuming or causing the user to give up his or her search before the relevant documents are found.

Most web search engines allow a user to refine his or her query by supporting interaction based on traditional information retrieval. Basically, most search engines provide an iterative method wherein a user can see what result were returned with an initial search query and then can try again by reformulating the query and having the web search engine return new results. The user can keep reformulating the query and going through the cycle over and over again, until the user either gets results that they are happy with or the user gives up and quits.

A number of tools have been developed that attempt to aid a user in performing better searches.

Attempts have been made at query expansion to allow a user to better refine a search query. Query expansion is the process of adding additional terms to the original query in order to improve the results retrieved by the search engine.

Some previous query expansion methods have used a thesaurus based approach. A thesaurus is constructed based on similarity of terms. Words relationships such as synonym, hypernym/hyponym and meronym/holonym relationships are used to suggest similar terms to expand the query.

Other previous query expansion methods have used top ranked documents returned by the initial search query as the knowledge base for the query expansion. In these techniques, the co-occurrence of terms are calculated using only the passages that contained the query terms, rather than the whole document.

Information retrieval of web documents poses a number of problems for previous query expansion techniques. Due to the extremely large volume of documents on the web, analysis of the entire collection is not feasible. In addition, web queries are often very short, often consisting of only two or three words. Techniques that are somewhat successful with longer search queries do not often prove to be effective with short queries.

SUMMARY OF THE INVENTION

It is an object of the present invention to provide a system and method that overcomes problems in the prior art.

In a first aspect of the invention, a memory for storing data for access by an application program being executed on a data processing system is provided. A data structure is stored in the memory and includes information resident in a database used by the application program and including: a plurality of concept data objects stored in the memory, each of said concept data objects containing information related to a concept; and a plurality of term data objects stored in the memory, each term data object containing information related to a term. Each of the term data objects is associated with one or more of the concept data objects and the association has an assigned weight.

In another aspect of the invention, a method of automatically generating a concept knowledge base data structure from a plurality of computer readable documents related to a knowledge field is provided. The method comprises: determining a plurality of concepts and for each concept creating a concept data object corresponding to the concept; for each concept, analyzing at least one computer readable document describing the concept and selecting terms in the computer readable document; and for each selected term, creating a term data object associated with the concept data object.

In another aspect of the invention, a data processing system for automatically generating a concept knowledge base data structure from a plurality of computer readable documents related to a knowledge field is provided. The data processing system comprises: at least one processing unit; a memory storage device operatively coupled to the processing unit; and a program module stored in the memory storage device operative for providing instructions to the at least one processing unit. The at least one processing unit is responsive to the instructions of the program module and the program module operative for: determining a plurality of concepts and for each concept creating a concept data object corresponding to the concept on the memory storage device; for each concept, analyzing at least one computer readable document describing the concept and selecting terms in the computer readable document; and for each selected term, creating a term data object on the memory storage device and associating the term data object with the concept data object.

In another aspect of the invention, a method of expanding a search query is provided. The method comprises: using a search query comprising a plurality of search terms, accessing a concept knowledge base data structure having a plurality of concept data objects and a plurality of term data objects, each term data object defining a term and associated with at least one of the concept data objects; generating a first term set containing term data objects from the concept knowledge base data structure wherein each term data object in the first term set matches one or more of the search terms; generating a concept set containing concept data objects from the concept knowledge base data structure wherein each concept data object in the concept set is associated with one or more of the term data objects in the first term set; generating a second term set containing term data objects from the concept knowledge base data structure wherein each term data object in the second term set is associated with one ore more of the concept data objects in the concept set; and in response to selecting one of the term data objects in the second term set, adding the term contained in the selected term data object to the search query.

In another aspect of the invention, a data processing system for expanding a search query is provided. The data processing system comprises: at least one processing unit; a memory storage device operatively coupled to the processing unit and containing a concept knowledge base data structure, the concept knowledge base data structure including: a plurality of concept data objects; and a plurality of term data objects, each term data object defining a term and associated with at least one of the concept data objects; and a program module stored in the memory storage device operative for providing instructions to the processing unit, the processing unit responsive to the instructions of the program module. The program module is operative for: using a search query containing one or more search terms, generating a first term set containing term data objects from the concept knowledge base data structure wherein each term data object in the first term set matches one or more of the search terms; generating a concept set containing concept data objects from the concept knowledge base data structure wherein each concept data object in the concept set is associated with one or more of the term data objects in the first term set; generating a second term set containing term data objects from the concept knowledge base data structure wherein each term data object in the second term set is associated with one ore more of the concept data objects in the concept set; and in response to selecting one of the term data objects in the second term set, adding the term contained in the selected term data object to the search query.

The present invention allows a user to refine a search query she or he is going to use to conduct a web search. A concept knowledge base is used to generate a query space that represents the query terms in relation to the concepts they describe and other terms that are related to these concepts. A visual representation of this query space allows the user to interpret the relationships between their query terms and the possible query terms generated in the query space. Interactive query refinement within this visual representation takes advantage of the user's visual information process abilities, and allows the user to choose terms that accurately represent this information need. A preview of the search results provides the user with the ability to take an active role in the information retrieval process, supporting the fundamental shift from information retrieval systems to information retrieval support systems.

In a first aspect a concept knowledge base data structure is provided. The concept knowledge base data structure contains a number of concept data objects and a number of term data objects. Each concept data object contains information that identifies a concept falling with an area of knowledge covered by the concept knowledge base, such as computer science, astronomy, etc. Each term data object contains information that identifies a term that describes one or more of the concepts represented by the concept data objects.

Each term data object is associated with one or more concept data objects. An edge data object is contained in the concept knowledge base data structure for each association between one of the term data objects and one of the concept data objects in the concept knowledge base data structure and identifies the associated term data object and concept data object. Additionally, each edge data object contains a weight, indicating the relevancy of the term contained in the term data object with the concept identified by the concept data object.

Although the concept knowledge data structure can be manually created in another aspect of the invention, a method and system is provided to automatically generate a concept knowledge base data structure from a number of computer readable documents. The computer readable documents will describe and area of knowledge that the concept knowledge base data structure will relate to. Each document will describe a concept falling within the area of knowledge. For each document, the concept the document describes is identified and if a concept data object has not already been created for that concept, a concept data object is created in the concept knowledge base.

Next a number of terms in the document are selected and a term data object is created for each unique term and associated with the concept data object corresponding to the concept the document is describing. The selected terms can be specific terms in the document that meet specified criteria or could be all of the terms in the document.

Typically, an edge data object is created in the concept knowledge base identifying an association between a term data object and a concept data object.

For each association between a term data object and a concept data object a weight is determined that indicates the relevancy of the term data object to the associated concept data object.

In a further aspect of the invention, a concept knowledge base data structure is used to generate a query space of additional terms that a user may want to use in his or her search query and are related to search terms in the search query by a common concept. A user inputs a search query he or she would like to have a search engine conduct a web search. The search query contains a number of search terms. The search terms are matched to terms contained in term data objects in the concept knowledge base data structure and a first term set is generated containing term data objects that match the query terms.

The term data objects in the first term set are then used to generate a concept set by adding concept data objects that are associated with one or more term data objects in the first term set to the concept set. In order to exclude concepts from the concept set that have a limited relevance to a term contained in a term data object in the first term set, typically, a first weight threshold is used to exclude concept data objects from the concept set that have limited relevance to the term in the term data object.

Additionally, a term ratio threshold is typically used to further exclude concept data objects from the concept set. If a concept data object is associated with one of the term data objects in the first term set with a weight greater than the first weight threshold, the concept data object is evaluated to determine the ratio of all of the term data objects in the first term set to which the concept data object is associated with a weight greater than the first weight threshold. If this ratio is less than the term ratio threshold, the concept data object is excluded from the concept set.

Next, the concept set is used to generate a second term set that will contain terms for the search space. The term data objects that are associated with one or more concept data objects in the concept set, that do not match one of the search terms, are selected for the second term set. Typically, a second weight threshold is used to exclude term data objects from the second term set that while associated with a concept data object in the concept set, are not strongly related to the concept data object. Term data objects associated with a concept data object in the concept set that have a weight of association that is less than the second weight threshold are excluded from the second term set.

The term data objects contained in the second term set, along with the concept set, form a query space and represent terms that a user may or may not wish to add to his or her original search query. Rather than this query space being generated on a general thesaurus based system where words or terms in the query space are related to one or more of the search terms in the original search query, (i.e. synonyms, homonyms, antonyms, etc. of one of the original search terms), the query space generated by the provided methods and systems results in generated terms that are related to an original search term via a concept. Rather than the generated terms in the second term set having a direct relationship with a search term in the original search query, the generated terms will have an implied relationship to one or more of the original search terms through a common concept. By providing a mapping between words and concepts to expand a query space, a more effective connection between the original search terms and the generated terms in the query space is created than using a thesaurus-based approach for generating terms for a query space.

In a further aspect of the present invention, the query space is visually represented to allow a user to see the relationship between a search terms, related concept and terms generated in the search space. Term data objects in the first term set are shown as selected term nodes in a visual representation of the search space. Term data objects in the second term set are shown as unselected term nodes and concept data objects are shown as concept nodes in the visual representations. Term nodes and concept notes that are associated are illustrated with a line connecting the term node and concept node, with the distance between the term node and concept node representing the weight assigned to the association. In this manner, a user can quickly see how relevant a term is to a concept by the closeness of the term node and the concept node.

A user can easily see the selected term nodes (the terms used in the search query) and how closely they are related to certain concepts. A user can also see how closely unselected term nodes (generated terms that may be added to the search query) are related to concepts, allowing a user to see a number of concepts they are trying to describe and then seeing the newly generated terms associated with the concept that the user may wish to add to his or her search query.

In a further aspect, a preliminary search is conducted using the original search query and displayed along with the visual representation of the query space so that a user can see what results their search query will provide, along with the visual representation of the search query. This preview can allow the user to determine the outcome, on the search results, of adding or removing terms from the search query.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
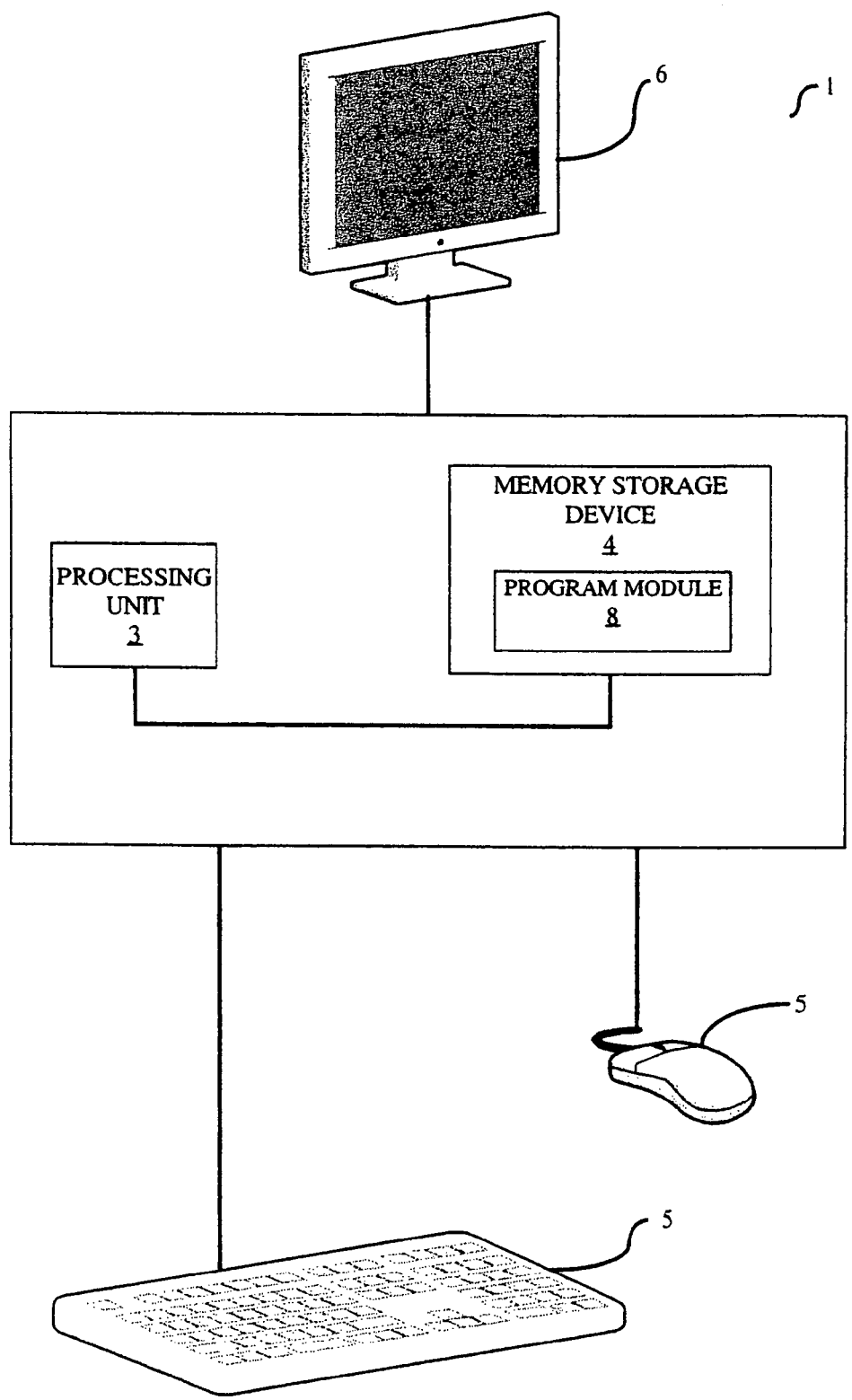
FIG. 1 is a data processing system operable to implement the methods disclosed herein.

FIG. 1 illustrates a data processing system 1 suitable for supporting the operation of methods in accordance with the present invention. The data processing system 1 could be a personal computer, server, mobile computing device, cell phone, etc. The data processing system 1 typically comprises: at least one processing unit 3; a memory storage device 4; at least one input device 5; a display device 6 and a program module 8.

The processing unit 3 can be any processor that is typically known in the art with the capacity to run the program and is operatively coupled to the memory storage device 4 through a system bus. In some circumstances the data processing system 1 may contain more than one processing unit 3. The memory storage device 4 is operative to store data and can be any storage device that is known in the art, such as a local hard-disk, etc. and can include local memory employed during actual execution of the program code, bulk storage, and cache memories for providing temporary storage. Additionally, the memory storage device 4 can be a database that is external to the data processing system 1 but operatively coupled to the data processing system 1. The input device 5 can be any suitable device suitable for inputting data into the data processing system 1, such as a keyboard, mouse or data port such as a network connection and is operatively coupled to the processing unit 3 and operative to allow the processing unit 3 to receive information from the input device 5. The display device 6 is a CRT, LCD monitor, etc. operatively coupled to the data processing system 1 and operative to display information. The display device 6 could be a stand-alone screen or if the data processing system 1 is a mobile device, the display device 6 could be integrated into a casing containing the processing unit 3 and the memory storage device 4. The program module 8 is stored in the memory storage device 4 and operative to provide instructions to processing unit 3 and the processing unit 3 is responsive to the instructions from the program module 8.

Although other internal components of the data processing system 1 are not illustrated, it will be understood by those of ordinary skill in the art that only the components of the data processing system 1 necessary for an understanding of the present invention are illustrated and that many more components and interconnections between them are well known and can be used.

Figure 2A:
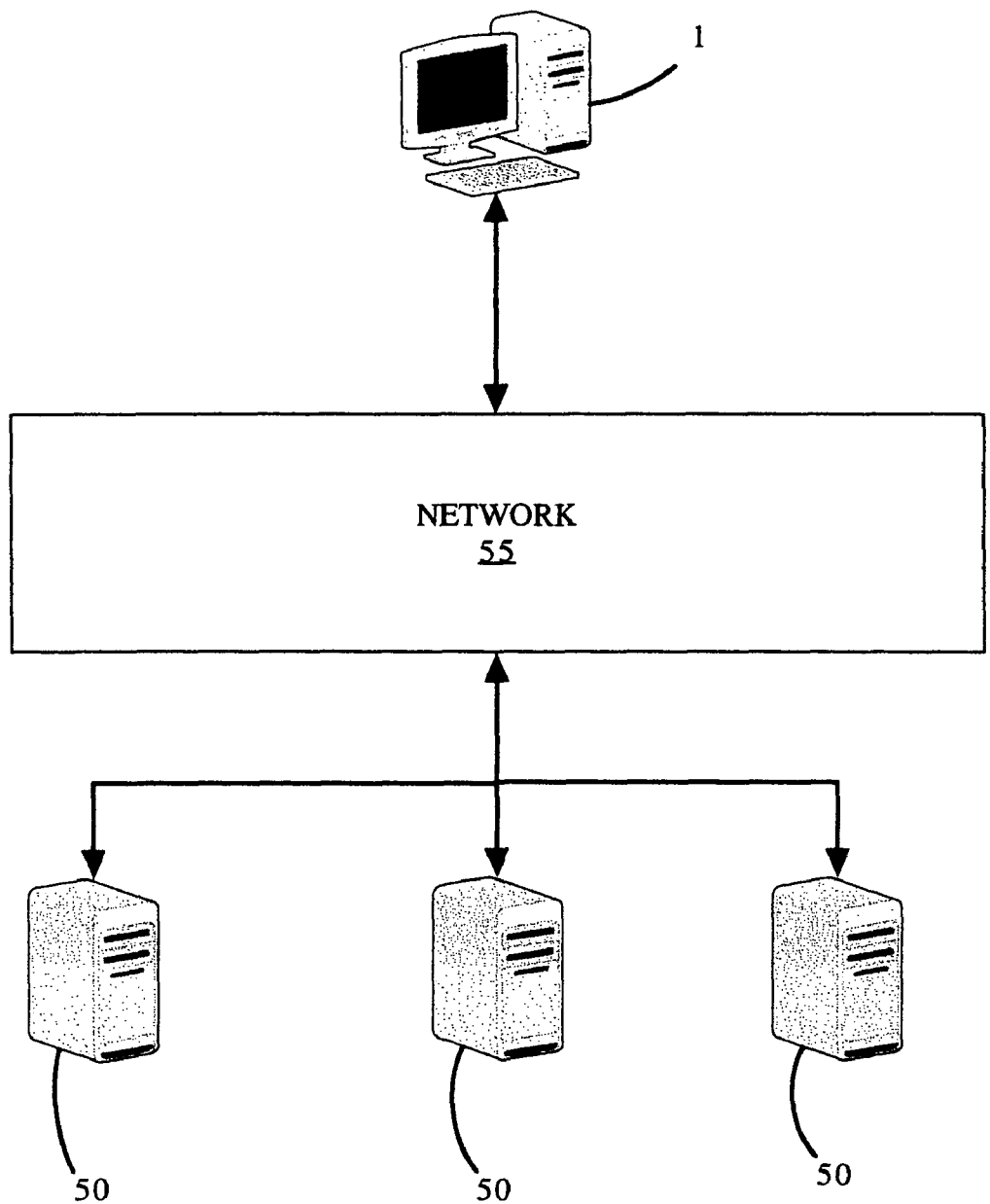
FIG. 2A is a schematic illustration of the data processing system configured for a user to directly interact with the data processing system.
Figure 2B:
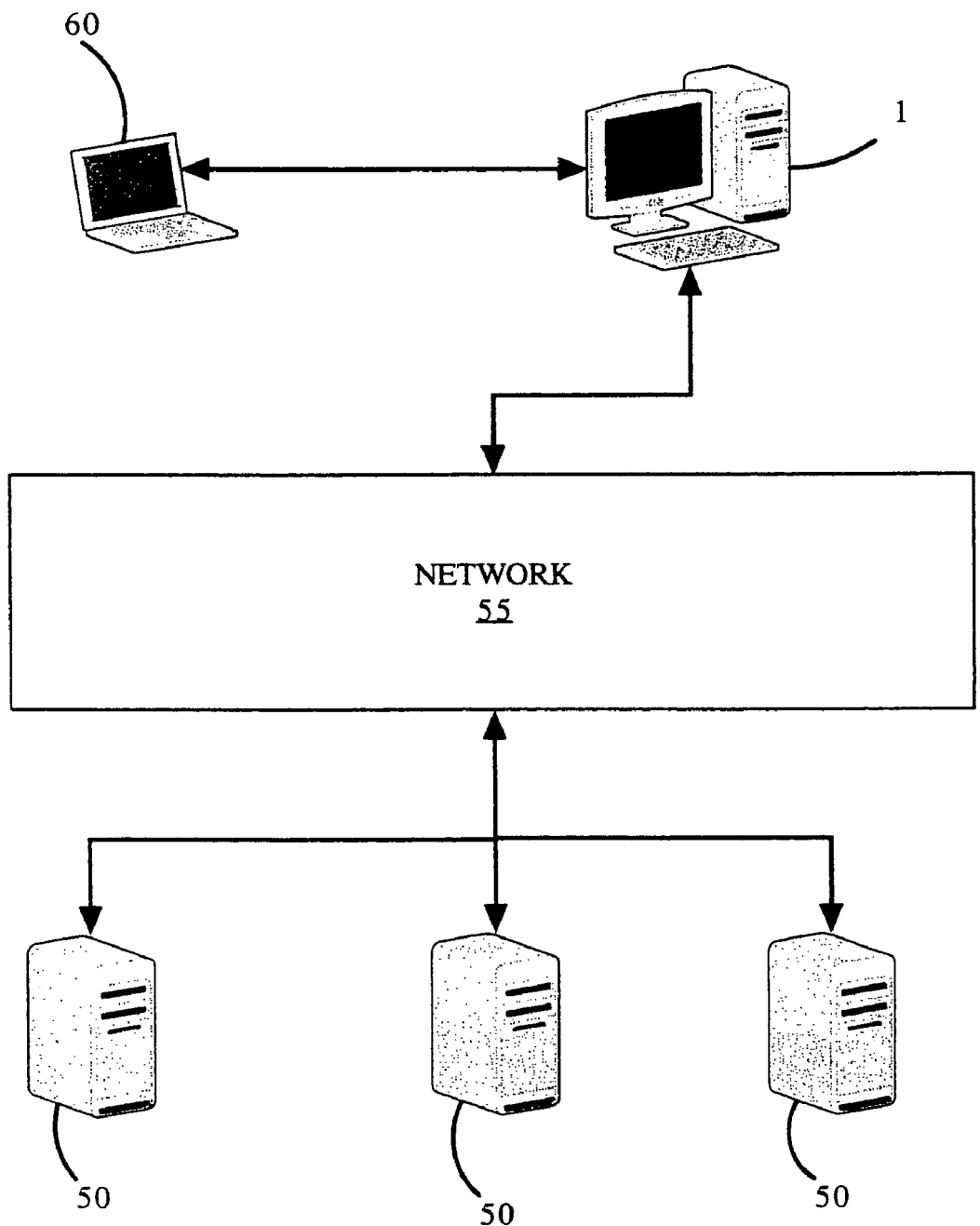
FIG. 2B is a schematic illustration of the data processing system configured as a server and allowing a user to remotely connect to the data processing system using a remote device.

FIG. 2A illustrates a network configuration wherein the data processing system 1 is connected over a network 55 to a plurality of servers 50 operating as a search engine. FIG. 2B illustrates a network configuration wherein the data processing system 1 is configured as a server and a remote device 60, such as another computer, a PDA, cell phone or other mobile device connected to the Internet, is used to access the data processing system 1. The data processing system 1 runs the majority of the software and methods, in accordance with the present invention, and accesses the a plurality of servers 50 operating as a search engine to conduct a web search. By having the data processing system 1 configured as a server, the remote client system 60 does not need to have the capacity necessary to contain all the necessary data structures and run all the methods.

Furthermore, the invention can take the form of a computer readable medium having recorded thereon statements and instructions for execution by a data processing system 1. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Concept Knowledge Base

Figure 3:
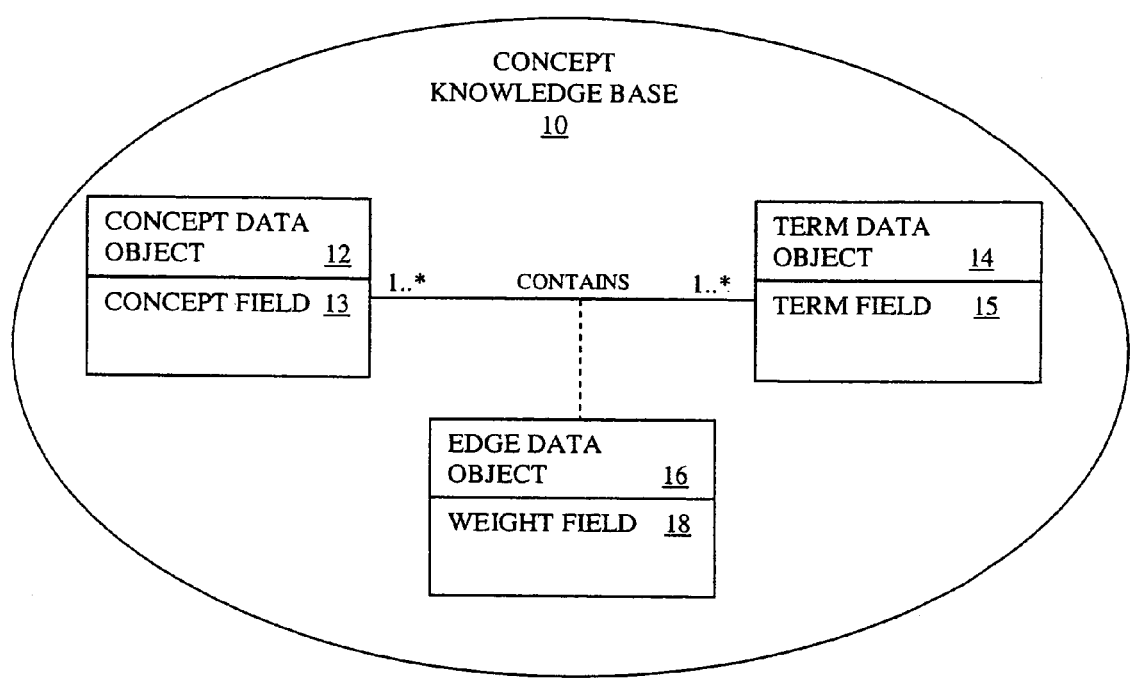
FIG. 3 is a data structure of a concept knowledge base, in accordance with the present invention.

FIG. 3 illustrates an architectural schematic of a data structure for a concept knowledge base 10, in accordance with an aspect of the present invention. The data structure is stored on a memory and is accessible by an application program being executed by a data processing system, such as the data processing system 1 illustrated in FIG. 1. The data structure contains information that is accessible by the application program.

The concept knowledge base 10 contains information relating to a field of knowledge. For example, the concept knowledge base 10 could contain information related to the field of science. The concept knowledge base 10 contains a number of concept data objects 12, a number of term data objects 14 and a number of edge data objects 16.

Each concept data object 12 contains a concept field 13 containing a concept that is related to a specific concept falling within the field of knowledge of the concept knowledge base 10. The concept field 13 typically contains a text string identifying the concept. For example, if the concept knowledge base 10 is for computer science, there may be concept data objects 12 with the concept field 13 containing the text string of "computer graphics", another concept data object 12 with the concept field 13 containing the text string of "distributed computing", another concept data object 12 with the concept field 13 containing the text string "artificial intelligence", etc.

Each term data object 14 contains a term field 15 containing a text string. The text string contains a word or phrase that describes a concept of one of the concept data objects 12.

Each concept data object 12 is associated with one or more term data objects 14 and each term data object 14 is associated with one ore more concept data objects 12. The association of a concept data object 12 and a term data object 14 is defined by an edge data object 16 which contains a weight field 18. A term data object 14 that is associated with a concept data object 12 contains a term in the term field 15 that describes the concept contained in the concept field 13 of the concept data object 12. The relevancy of the term in the term field 15 of the term data object 14 to the concept in the concept field 13 of an associated concept data object 12 is represented by a weight in the weight field 18 of the edge data object 16.

Figure 4:
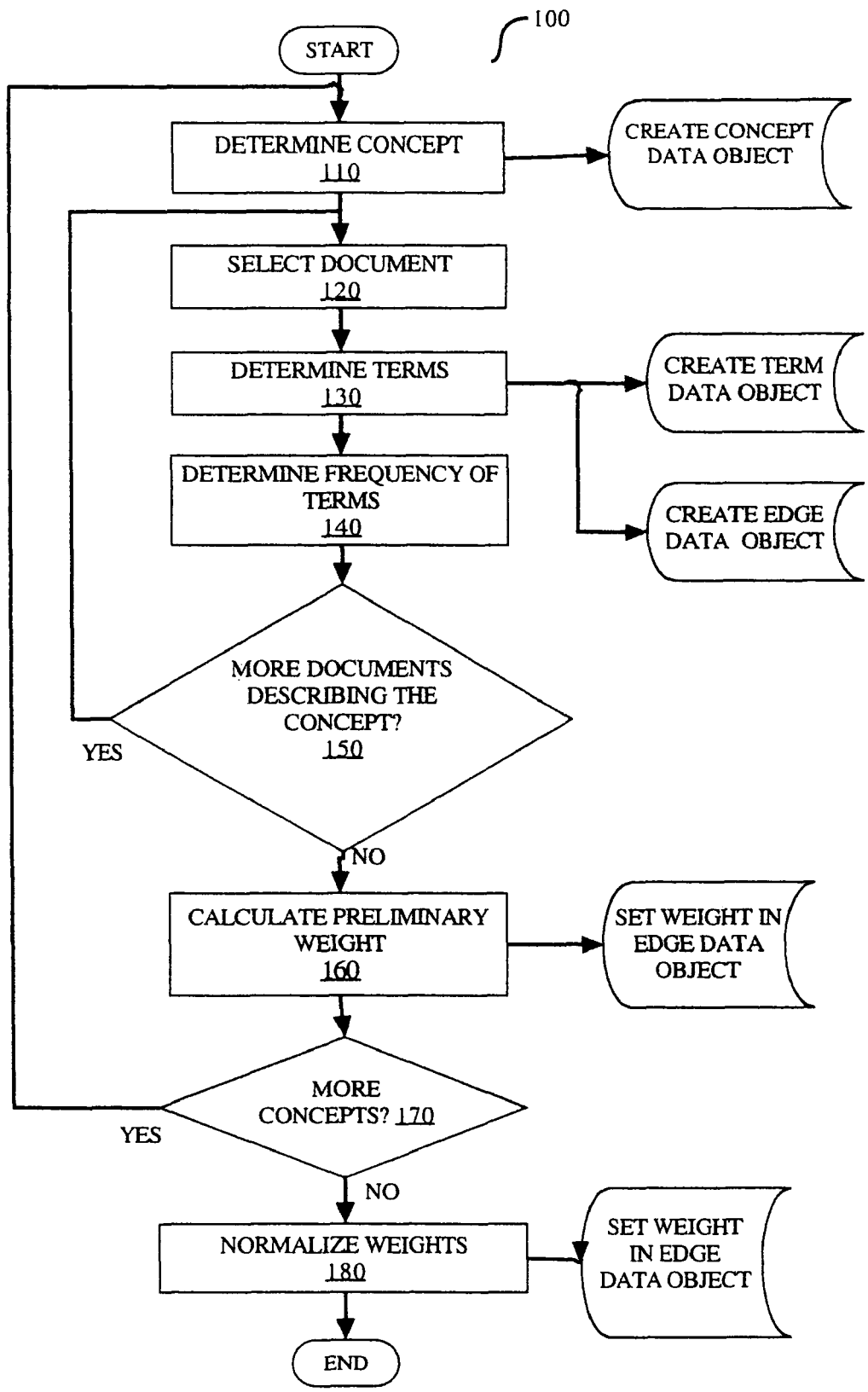
FIG. 4 is a flowchart illustrating a method of automatically creating an instance of a concept knowledge base.

While it is possible to manually construct the data structure containing the concept knowledge base 10, FIG. 4 illustrates a flowchart of a method of automatically creating a data structure containing a concept knowledge base in accordance with the present invention.

Method 100 comprises the steps of: determining a concept 110; selecting a document describing the concept 120; determining terms in the document to be analyzed 130; determining the frequency of the selected terms 140; checking if there are any remaining documents describing a concept 150; calculating a preliminary weight 160; checking if there are any more concepts 170; and normalizing all of the weights 180.

The method takes a number of documents and/or descriptions in computer readable form that describe a number of different concepts in a knowledge area and uses the documents to automatically generate a data structure of a concept knowledge base 10, as shown in FIG. 3.

The method 100 begins with step 110. A concept falling within the concept knowledge base is determined and a concept data object is created with information identifying the concept contained in the concept field.

Each concept will be described by one or more documents or descriptions in computer readable format. Once a concept has been determined at step 110, one or more documents describing the concept are identified and at step 120 one of these documents is selected to be analyzed.

At step 130, the method 100 determines the terms to be analyzed in the document. For each term to be analyzed, method 100 creates a term data object for each selected term with the term field containing the term, if a term data object containing the term does not already exist. An edge data object indicating the association of the term data object and the concept data object is also created and after the method 100 is completed will contain a weight indicating the relation of the term data object with the associated concept data object containing the concept described by the document being analyzed.

The terms that are analyzed can include all of the words used in the document or only specific words in the documents. For example, common words that are basically non-descriptive, such as "the", "a", "this", etc. may be excluded from the selected terms that are selected for analysis at step 130.

At step 140 the frequency of each of the selected terms in the selected document is determined. The occurrence of each selected term in the document is determined. The occurrence of a selected term $t_j$ in the document being analyzed can easily be determined, via text matching, and is defined by the function:

$$f(d_{ik}, t_j)$$

Each of the terms appearing in the document are then averaged based on the number of occurrences of all of the terms in the document. For example, the averaging could be done using the following equation:

$$f^*(d_{ik}, t_j) = \frac{f(d_{ik}, t_j)}{\sum_{l=1}^{m} f(d_{ik}, t_{l,ik})}$$

where $d_{ik}$ is the document being analyzed for the set of terms $t_{ik} = \{t_{1,ik}, \ldots, t_{m,ik}\}$ with m being the number of terms in document $d_{ik}$. This equation simply divides the frequency or tally of a term being analyzed by the total number of terms being analyzed in document $d_{ik}$. By conducting this averaging, the eventual weight determined for each association between a term node and a concept node takes into account the number of occurrences of a term in the document and provides a potentially more relevant indicator of the relation between the term data object to the concept data object because words or terms that appear often relative to the total number of terms will be given more weight. This preliminary averaging is used to try to prevent a single large document describing a concept from providing term weights that overshadow the weights provided by a number of smaller documents.

Next, at step 150, the method 100 checks to see if there are any more documents related to the concept that have not been analyzed. If there are more documents to be analyzed related to the concept, the method 100 returns to step 120, selects the next unanalyzed document and repeats steps 130, 140 and 150. As long as more documents related to the concept exist, step 150, causes the method 100 to analyze all of the documents. When there are no more documents related to the concept to be analyzed, the method 100 continues on to step 160.

At step 160 the method 100 calculates a preliminary weight for each of the terms used in the documents related to a single concept. For each term an interim weight $w_{ij}^*$ is calculated taking into account the average term frequency of the documents related to the concept.

$$w_{ij}^* = \frac{\sum_{k=1}^{n} f^*(d_{ik}, t_j)}{n}$$

Wherein there are 1 . . . n documents.
This equation, in its entirety, is as follows:

$$w_{ij}^* = \frac{\sum_{k=1}^{n} \frac{f(d_{ik}, t_j)}{\sum_{l=1}^{m} f(d_{ik}, t_{l,ik})}}{n}$$

This calculation is used to prevent concepts with a large numbers of documents from producing term weights that overshadow term weights from concepts with fewer documents describing the concept.

At step 170, the method 100 checks to see if there are any more concepts left to be evaluated. If there are concepts remaining that have not been analyzed, the method 100 returns to step 110 and the next concept is selected to be analyzed. The method 100 then repeats steps 120, 130, 140, 150 and 160 determining a preliminary weight for each of the terms appearing in the documents describing the selected document. The method 100 continues to analyze each concept repeating steps 110, 120, 130, 140, 150, 160 and 170 until all of the concepts have been analyzed, at which point, the method 100 continues on to step 180.

At step 180 the method 100 determines a normalized weight for each of the terms associated with the concepts. The preliminary weight $w_{ij}^*$ previously determined for each association between a term $t_i$ and a concept is divided by the sum of all of the weights determined for the term $t_i$ connected to r concepts. This equation is shown as follows:

$$w_{ij} = \frac{w_{ij}^*}{\sum_{k=1}^{r} w_{ij}^{*(k)}}$$

Wherein the index f(k) is given by f(x), x=1 . . . r, representing the r concepts to which term i is connected to in the concept knowledge base.

The normalization of the weights is used to prevent common terms that are included in many of the documents for many concepts from having higher weight values than other less common terms. These terms are often of little value in describing a concept. By using normalization, the weights of common terms are significantly reduced. Without this normalization step, common terms that are included in many documents for many different concepts would have a very high weight, even though these terms are of little value in describing the concept. With this normalization step, the weights of these common terms are significantly reduced.

Additionally, rather than using the terms exactly as they appear in the documents or descriptions, in a further aspect of the invention, the stems of the roots of the terms are used to construct the knowledge base allowing terms to be matched based on their stems or roots rather than being based on exact text matches.

Additionally, in some circumstances it may not be necessary to analyze every term in a document. In a further aspect, the method 100 will focus on only specific terms in a document that are highlighted in a particular way, i.e. in an abstract. Alternatively, there could be a list of terms that are not analyzed, such as common terms that are not descriptive of a concepts, for example terms such as the, and, etc. may be excluded from being selected.

At the conclusion of the method 100 a concept knowledge base as illustrated in FIG. 3 will have been automatically constructed by the method 100.

Framework for Visual Refinement Software

Figure 5:
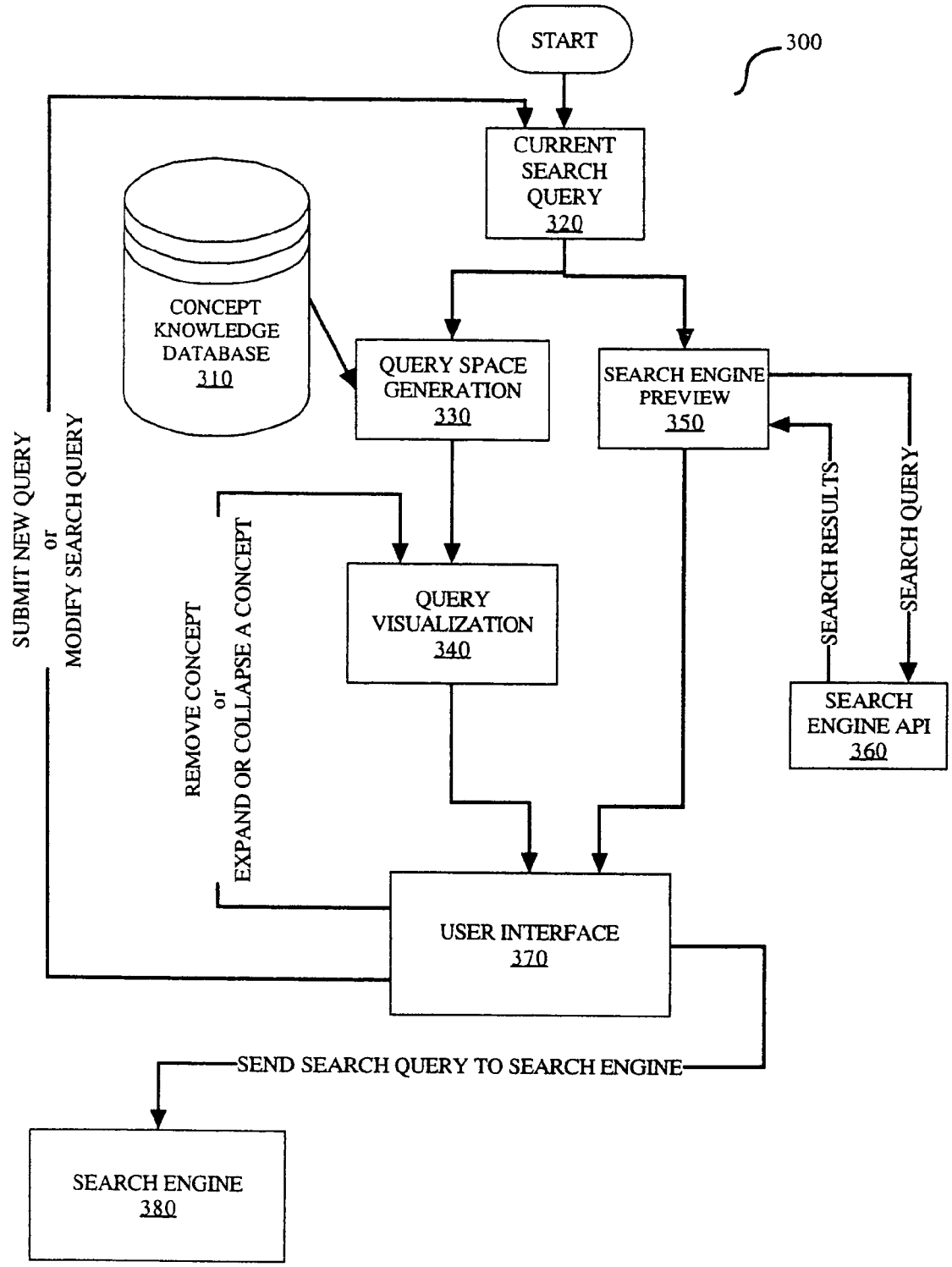
FIG. 5 is an overview software system for interactive query refinement.

FIG. 5 illustrates a software system of a visual query refinement method. The software system 300 comprises: a concept knowledge database 310; a current search query module 320; a query space generation module 330; a query visualization module 340; a search engine preview module 350; a search engine API module 360; a user interface module 370; and a search engine 380.

The search query will comprise one or more search terms. The software system 300 can be implemented on a data processing system, such as the data processing system 1 as shown in FIG. 2A. The data processing system 1 can be a client computer connected to the Internet with the software system 300 being executed completely on the user's client computer, with the exceptions of the search engine API 360 and the search engine 380, which would typically be implemented on one or more of the servers 50. Alternatively, various modules could be implemented on the data processing system 1 configured as a server 50, as shown in FIG. 2B, with the user merely inputting the search query from a remote device 60, i.e. a PDA or mobile phone with an Internet connection, and the software system 300 is primarily implemented on the data processing system 1 with the exception of the user interface module 370 which would be executed on the remote device 60.

The search query is entered into the system at the current search query module 320. From the search query module 320 the search query is passed to the query space generation module 330, which accesses the concept knowledge database 310, to generate a query space of terms a user may wish to add to his or her search query. Typically, the concept knowledge database 310 contains a concept knowledge base data structure as shown in FIG. 3.

From the query space generation module 330 the generated query space is passed to the query visualization module 340 where a visual representation of the query space is generated. The visual representation of the query space is then passed to the user interface module 370.

Additionally, the current search query module 320 also passes the search query to a search engine preview module 350 that has a search engine API 360 conduct a preview of a web search using the search query and passes the results of preview of the web search to the use interface module 370.

The user interface module 370 displays the visual representation of the query space to a user along with the results of a preview search. The user can perform a number of operations using the user interface module 370, such as, submitting a new search query; modify the search query by adding or removing terms; remove a concept; expand or collapse a concept; and sending the search query to the search engine.

Query Space Generation

The software system 300 begins with an initial search query being input to the current search query module 320 which passes the search query to the query space generation module 330. The query space generation module 330 accesses a concept knowledge database 310 and uses the information in the concept knowledge database 310 to generate a query space from the search query.

Figure 6:
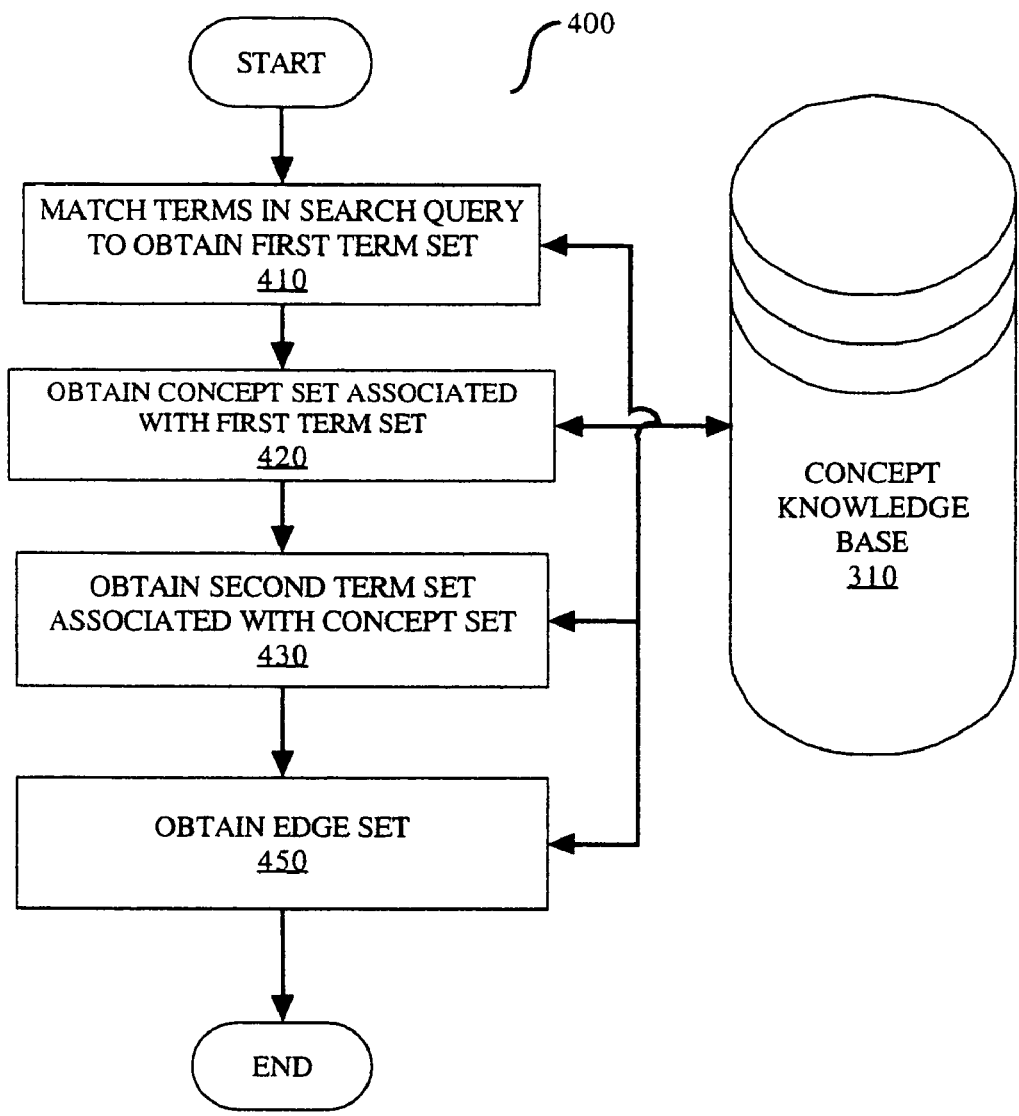
FIG. 6 is a flowchart of a method of generating a query space using a concept knowledge database.

FIG. 6 illustrates a flowchart of a method for query expansion that is implemented by the query space generation module 330 in FIG. 5, using the concept knowledge database 310. When a search query is passed to the query space generation module 330, the method 400 uses the concept knowledge database 310 to generate a query space to expand the terms used in the search query using relationships to concepts to obtain additional terms that are relevant to the terms in the search query.

Method 400 comprises the steps of: matching terms in the search query to term data objects in the concept knowledge base to obtain a first term set 410; obtaining a concept set of concept data objects associated with the first term set 420; obtaining a second term set of term data objects associated with the concepts objects in the concept set 430; and obtaining an edge set 450.

The method 400 begins with step 410 and the terms in the search query being matched to term data objects in the concept knowledge database 310. The concept knowledge database 310 is accessed and each of the terms making up the search query are matched with any term data objects that have a term in the term field matching the term in the search query. A first term set containing these selected term data objects is obtained. After step 410 is completed, all of the term data objects in the concept knowledge database 310 that have a term in the term field that corresponds to one of the terms in the search query are identified and these term data objects are added to a first term set.

At step 420, the first term set is used to obtain a concept set containing concept data objects from the concept knowledge database 310 associated with one or more term data objects in the first term set. The term data objects making up the first term set are used to obtain a number of concept data objects from the concept knowledge database 310. Concept data objects associated with one or more term data objects in the first term set are selected to form the concept set.

Concept data objects that are not strongly associated with term data objects in the first terms set are excluded from the concept set using a first weight threshold and a term ratio threshold. The first weight threshold is used to exclude concept data objects that are not strongly associated with one of the term data objects in the first term set by comparing the weight assigned to an association between a concept data object and a term data object and excluding the concept data object from the concept set if the weight determined for the association is less than the first weight threshold. By using this first weight threshold, the concept set is limited to only the more relevant concepts. Additionally, a term ratio threshold is used to further exclude concept data objects from the concept set. If a concept data object is associated with one of the term data objects in the first term set with a weight greater than the first weight threshold, the concept data object is evaluated to determine the ratio of all of the term data objects in the first term set to which the concept data object is associated with a weight greater than the first weight threshold. If this ratio is less than the term ratio threshold, the concept data object is excluded from the concept set.

At step 430 a second term set is obtained. Each of the concept data objects in the concept set are evaluated to determine term data objects, in the concept knowledge base 110, associated with each of these concept data objects. Term data objects associated with the concept data objects selected for the concept set are added to the second term set. A second weight threshold is used to exclude term data objects from the second term set if they are associated with concept data objects in the concept sets by a weight that is less than the second weight threshold.

At step 450, an edge set containing edge data objects from the concept knowledge database 310 is obtained. The edge data object defining the association between the term data objects in the first term set and the concept data objects in the concept set along with the edge data objects defining the association between the concept data objects in the concept set and the term data objects in the second term set are placed in the edge set.

At this point, the method 400 ends and there is: a first term set containing term data objects that correspond to terms in the search query; a concept set containing concept data objects associated with term data objects in the first term set, that represent concepts the terms in the search query could be describing; a second term set containing term data objects associated with one or more concept data objects in the concept set, that indicate further terms that may be used to describe the concepts the user may be trying to look for; and an edge set defining the associations between the term data objects and concept data objects in the different sets.

Through experiments, the first weight threshold, term ratio threshold and second weight threshold can be determined. For example, some initial studies found that a first weight threshold of 0.05, a term ratio threshold of 0.51 and a second weight threshold of 0.10 provided satisfactory results.

Referring again to FIG. 5, after the query space (a first term set, a concept set, a second term set and an edge set) is generated by the query space generation module 330, the query space contains: a first term set containing term nodes matching terms in the search query; a concept set, containing concept nodes associated with term nodes in the first term set; a second term set containing term nodes associated with concept nodes in the concept set; and an edge set containing edge data objects defining the association between term data objects and concept data objects. This query space is passed to the query visualization module 340 to generate a visualization representation of the query space.

Visualization of the Query Space

Referring again to FIG. 5, using the query space generated by the query space generation module 330, the query visualization module 340 generates a visual representation of the query space.

Figure 7:
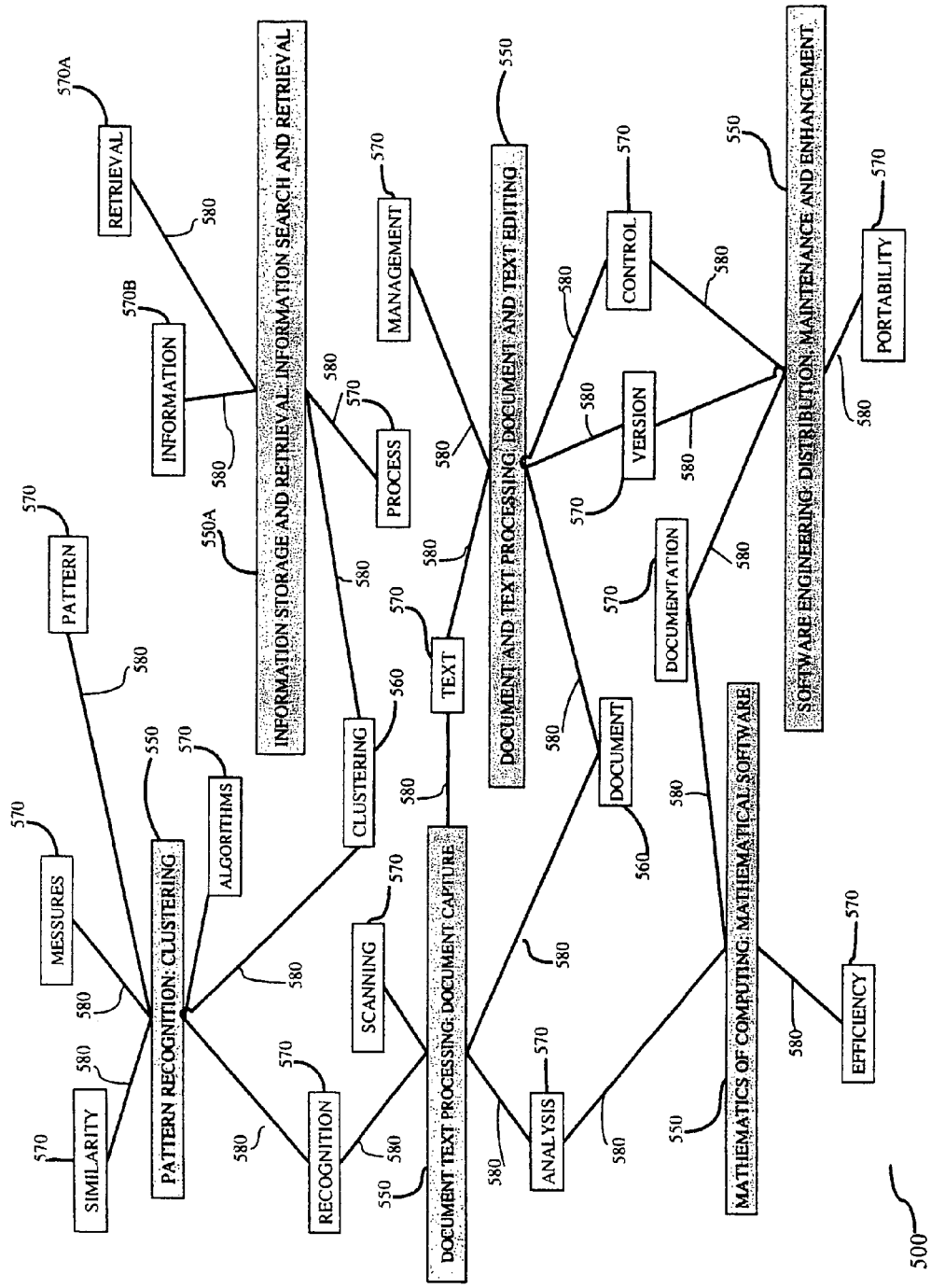
FIG. 7 is an exemplary illustration of a visual representation of a generated query space.

FIG. 7 illustrates an example of a visual representation of a generated query space. The visual representation 500 contains: a number of concept nodes 550; selected term nodes 560 and unselected term nodes 570. Concept nodes 550 have one or more connecting lines 580 joining the concept node 550 to either selected term nodes 560 or unselected term nodes 570 that are associated with the concept node 550.

The concept data objects contained in the concept set are used to create the concept nodes 550. Each concept data object in the concept node is used to create a concept node 550 in the visual representation 500 and the concept in the concept field of the concept data object is inserted as text on the concept node 550.

The term data objects contained in the first term set are used to create the selected term nodes 560. Each term data object in the first term set is used to create a single selected term node 560 in the visual representation 500 and the term in the term field of the concept is inserted as text on the term node 560.

The term data objects contained in the second term set are used to create the unselected term nodes 570 in the visual representation 500. An unselected term node 570 is created on the visual representation 500 for each term data object contained in the second term set with the term in the term field of each term data object used as text on the unselected term node.

The edge data objects in the edge set define the associations between the term data objects in the first and second term set and the concept data objects in concept set. Each edge data object in the edge set is used to draw the connecting lines 580 between associated concept nodes 550 and unselected term nodes 560 and unselected term nodes 570. The distance between a concept node 550 and an associated selected term node 560 or associated unselected term node 570 joined by a connecting line 580 is a function of the weight of the association indicated in the edge concept. For example, if a weight of an association between a first unselected term nodes 570A and a concept node 550A is less than the weight of an association between the concept node 550A and a second unselected term nodes 570B, the first unselected term node 570A is positioned in the visual representation 500 further away from the concept node 550A than the second unselected term node 570B.

The concept nodes 550 are rendered in the visual representation 500 so that the concept nodes 550 can be visually distinguished from the selected term nodes 560 and the unselected term nodes 570. Typically, colors are used to make the concept nodes visually distinctive, i.e. the concept nodes 550 being rendered with a red background.

The selected term nodes 560 and unselected term nodes 570 are also rendered in the visual representation 500 to be visibly distinguishable from each other. Typically, this is also done by rendering the selected nodes 560 and unselected term nodes 570 with different background colors from each other. For example, the selected term nodes 560 might be rendered with a yellow background or some other bright color and the unselected term node 570 can be rendered in some neutral color, such as grey.

The visual representation 500 allows users to properly interpret the underlying features of the query space. Users are able to visually distinguish between concept nodes 550, selected term nodes 560 and unselected term nodes 570; along with the relationship between these nodes. Terms the user used in their original search query are shown in the visual representation as selected term nodes 560, allowing a user to easily distinguish between terms in the visual representation 500 that the user used in his or her search query and new terms that were generated and that the user may wish to add to their search query. Additionally, this allows a user to identify whether the terms they have used in their search query are actually appropriate for their information needs. If the concepts shown in the concept nodes 550 are unrelated to the to the information the user is seeking, the search query may not be a proper search query and the user can try a completely new search query. The visual representation 500 can allow a user to determine if the search query they have used have very general terms (i.e. connect to numerous concept nodes) or very specific terms (i.e. connected to very few concepts).

Search Engine Preview

Referring again to FIG. 5, from the current search query module 320, the search query terms are also passed to the search engine preview module 350 to conduct a preview search on the search engine using the search query. The search engine preview module 350 passes the search query to the search engine API 360 and the search engine API 360 returns the results of the search to the search engine preview module 350. These preview results could be a the results of a full search or, alternatively, a subset of the information located in the search such as number of documents returned by the query, the title of the documents and the URL of a set number of these documents.

For example, both Google™ and Yahoo! offer API services that allows the system to request a search preview.

The results of the search preview are passed from the search engine preview module 350 to the user interface module 370.

User Interface

A user interface module 370 is provided. If the user is using the data processing system 1 as shown in FIG. 2A, the user interface module 370 is executed on the data processing system 1 with a use interface displayed on the display device 6. Alternatively, if the user is accessing the data processing system 1, as shown in FIG. 2B, through the remote client device 60, the user interface module 370 is typically executed on the remote device 60 with a user interface displayed on a screen of the remote device 60.

The user interface module 370 displays to a user a visual representation created by the query visualization module 340 using the query space generated by the query space generation module 330, along with a search preview obtained by the search engine preview module 350.

Figure 8:
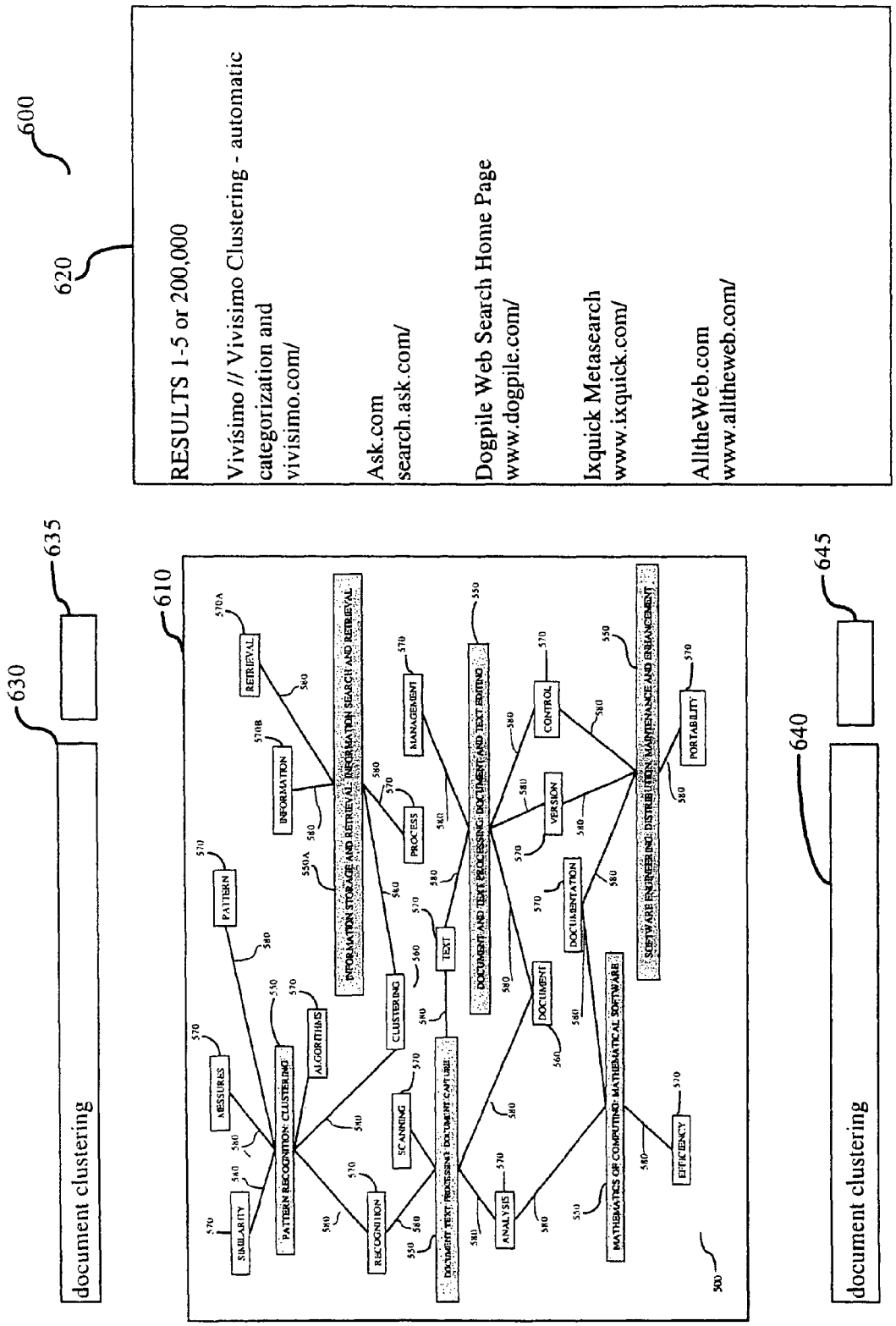
FIG. 8 is an exemplary illustration of a user interface.

FIG. 8 illustrates an embodiment of a user interface 600 displayed to the user by the user interface module 370. The user interface 600 comprises: a visual representation 610; a search engine preview 620; a first text field 630 and a second text field 640. The visual representation 610 and the search engine preview allow a user to see the success of his or her search.

The user interface 600 allows a user to: submit a new search query; modify the search query; remove a concept; expand or collapse a concept; and send the query to the search engine.

Submitting a New Search Query

When a user sees the visual representation 610 and the search engine preview 620, if the results are much different than what the user wanted, the user can conduct a completely new search by entering a new search query in the first text field 630 and selecting a search button 635.

Referring again to FIG. 5, when a user enters a new search query, the new search query is passed from the user interface module 370 to the current search query module 320, where the system 300 again generates a new query space with the query space generation module 330, creates a visual representation of the query space with the query visualization module 340, and a search engine preview with the search engine preview module 350 using the new search query.

Modifying the Search Query

A user can also add terms to the search query by selecting unselected terms on the visual representation 610. To add a term a user selects an unselected term node in the visual representation 610 and the term in the term node is added to the terms of the search query.

Referring to FIG. 5, the term is added to the search query to form a new search query and the new search query is passed to the current search query module 320 and modules 330, 340, 350 and 360 to generate an updated visual representation 610 and search preview using the new search query.

Additionally, a user can remove a term from the search query by selecting a selected term node in the visual representation 610. Referring to FIG. 5, the term is removed from the search query to form a new search query and the new search query is passed to the current search query module 320 and modules 330, 340, 350 and 360 to generate an updated visual representation 610 and search preview using the new search query.

Remove a Concept Node from the Visual Representation

Upon seeing the visual representation 610 a user may identify concept nodes illustrated in the visual representation that display concepts the user believes are not relevant to the information the user is trying to obtain in the search. To remove one of these concept nodes from the visual representation, a user selects the concept node in the visual representation 610.

Referring again to FIG. 5, when a user removes a concept node by selecting the concept node on the visual representation, the corresponding concept data object in the concept set is passed to the query visualization module 340 where a new visual representation of the query space is obtained with the concept data object and any term data objects in the second term set that are only associated with the removed concept data object removed. This new visual representation is then passed to the user interface 370.

Expand or Compact a Concept

A user can choose between an expanded and a compacted visual representation of a concept by selecting the node to be expanded or compacted. The user selects a concept node 550A on the visual representation 610 that the user either wishes to expand (if the concept node is compacted) or compact (if the concept node is currently expanded).

Figure 9:
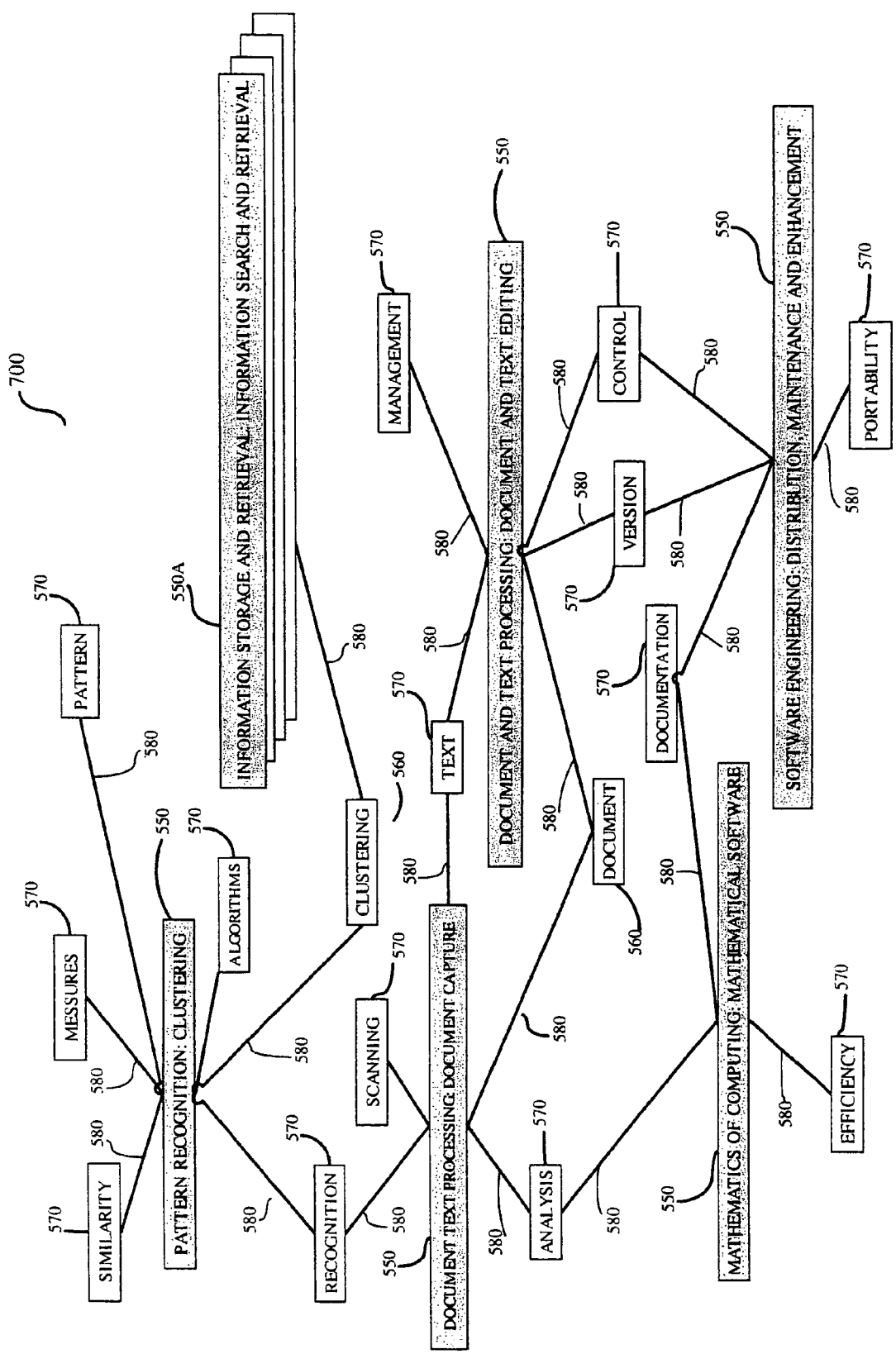
FIG. 9 is an exemplary illustration of a visual representation of a generated query space wherein a concept is compacted.

Referring to FIG. 5, the query space is passed back to the query visualization module 340 where a new visual representation of the query space is generated with the concept node compacted, such as the visual representation 700 shown in FIG. 9, if the concept node was expanded, or expanded, if the concept node was previously compacted.

Send the Query to the Search Engine

Finally, the user interface 370 allows a user to send the search query to a search engine to conduct a regular web search using the search query. A user selects the search button 645 and, referring to FIG. 5, the software system 300 transmits the search query to a search engine 380 to have the search engine conduct a search based on the search query.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A computer implemented method of expanding a search query, the computer comprising at least one processor for executing computer readable instructions stored in a memory, the method comprising comprising:

receiving at the computer a search query comprising at least one search term;

accessing a concept knowledge base data structure from a memory storage device, the concept knowledge base data structure comprising:

having a plurality of concept data objects each associated with a concept described by one or more computer readable documents;

a plurality of term data objects, each term data object defining a term in the one or more computer readable documents; and a plurality of edge data objects, each edge data object indicating an association of each of the term data objects with the concept data objects, each edge data object containing a weight indicating a normalized frequency of occurrence of the term of the term data object in the one or more computer readable documents describing the concept associated with the term;

generating a first term set containing term data objects from the concept knowledge base data structure wherein each term data object in the first term set matches one or more of the at least one search term;

generating a concept set containing concept data objects from the concept knowledge base data structure wherein each concept data object in the concept set is associated with one or more of the term data objects in the first term set;

generating a second term set containing term data objects from the concept knowledge base data structure wherein each term data object in the second term set is associated with one or more of the concept data objects in the concept set;

generating a visual representation for display on a display device by graphically representing the term data objects in the first term set and the term data objects in the second term set as term nodes and the concept data objects in the concept set as concept nodes connected by lines based upon the associated edge data object weight connecting the term nodes and the concept nodes and wherein one or more of the term data objects can be selected to add the term contained in the selected term data object to the at least one term of the search query by selecting the term node corresponding to the selected term data object; and receiving a selection of one of the term data objects in the second term set, adding the term contained in the selected term data object to the search query.

2. The method of claim 1 wherein each concept data object contained in the concept set is associated with at least one of the term data objects in the first term set by the weight in the associated edge data object greater than a predetermined weight threshold.

3. The method of claim 2 wherein the occurrence of the term is defined by a term ratio calculated by determining a ratio of all of the term data objects in the first term set and a number of term data objects in the first term set, that the concept data object has an association with, greater than the weight threshold, and wherein each concept data object contained in the concept set has a term ratio greater than a term ratio threshold.

4. The method of claim 1 wherein each concept data objects contained in the concept set is associated with at least one of the term data objects in the first term set with a weight greater than a first weight threshold and each term data object in the second term set is associated with at least one of the concept data objects in the concept set by a weight greater than a second weight threshold.

5. The method of claim 4 wherein the weight assigned to the association is represented by a distance between the term node and the concept node.

6. The method of claim 1 further comprising, in response to a user selecting one of the concept nodes in the visual representation, removing the selected concept node and any term nodes representing term data objects associated only with a concept node represented by the selected concept node from the visual representation.

7. The method of claim 1 further comprising requesting search results from a search engine using the search query and displaying the search results to the on the display device in conjunction with the visual representation.

8. A data processing system for expanding a search query, the data processing system comprising:

at least one processing unit;

at least one memory storage device operatively coupled to the processing unit and containing a concept knowledge base data structure, the concept knowledge base data structure including:

a plurality of concept data objects each associated with a concept described by one or more computer readable documents; and a plurality of term data objects, each term data object defining a term in the one or more computer readable documents;

a plurality of edge data objects, each edge data object indicating an association of each of the term data objects with the concept data objects, each edge data object containing a weight indicating a normalized frequency of occurrence of the term of the term data object in the one or more computer readable documents describing the concept associated with the term;

a program module stored in the at least one memory storage device operative for providing instructions to the at least one processing unit, the at least one processing unit responsive to the instructions of the program module, the program module operative for:

receiving a query comprising at least one search term, generating a first term set containing term data objects from the concept knowledge base data structure wherein each term data object in the first term set matches one or more of the at least one search term;

generating a concept set containing concept data objects from the concept knowledge base data structure wherein each concept data object in the concept set is associated with one or more of the term data objects in the first term set;

generating a second term set containing term data objects from the concept knowledge base data structure wherein each term data object in the second term set is associated with one or more of the concept data objects in the concept set; and receiving a selection of one of the term data objects in the second term set, adding the term contained in the selected term data object to the search query;

a display device operatively coupled to the data processing system and the program module is operative to direct the processing unit to display a visual representation on the display device by graphically representing the term data objects in the first term set and the term data objects in the second term set as term nodes and the concept data objects in the concept set as concept nodes connected by lines based upon the associated edge data object weight connecting the term nodes and the concept nodes.

9. The data processing system of claim 8 wherein each concept data object contained in the concept set is associated with at least one of the term data objects in the first term set by the weight in the associated edge data object greater than a predetermined weight threshold.

10. The data processing system of claim 9 wherein occurrence of the term is defined by a term ratio calculated by determining the ratio of all of the term data objects in the first term set and a number of term data objects in the first term set that the concept data object has an association with greater than the weight threshold, and wherein each concept data object contained in the concept set has a term ratio greater than a term ratio threshold.

11. The data processing system of claim 8 wherein each concept data objects contained in the concept set is associated with at least one of the term data objects in the first term set with a weight greater than a first weight threshold and each term data object in the second term set is associated with at least one of the concept data objects in the concept set by a weight greater than a second weight threshold.

12. The data processing system of claim 11 wherein the weight assigned to the association is represented by a distance between the term node and the concept node.

13. The data processing system of claim 12 wherein the term nodes corresponding to the term data objects in the first term set are visually distinctive from the term nodes corresponding to the term data objects in the second term set.

14. The data processing system of claim 13 wherein the term nodes corresponding to the term data objects in the first term set are displayed in a first color and the term nodes corresponding to the term data objects in the second term set are a second color.

15. The data processing system of claim 8 wherein the data processing system further comprises an input device and a term data object is selected by a user using the input device to indicate the term node corresponding to the term data object.

16. The data processing system of claim 8 wherein the program module is operative for, in response to a user selecting one of the concept nodes in the visual representation, removing the selected concept node and any term nodes representing term data objects associated only with a concept node represented by the selected concept node from the visual representation.

17. The data processing system of claim 8 wherein the input device is a computer mouse and the user uses the mouse to select the term node corresponding to the term data object.

18. The data processing system of claim 8 wherein the program modules is operative for: requesting search results from a search engine and displaying the search results on the display device in conjunction with the visual representation.

19. The data processing system of claim 8 wherein the data processing system is operatively connectable to a remote device and wherein a user of the remote device inputs the search query to the data processing system and wherein the program module is operative to direct the processing unit to communicate with the remote device and display a visual representation on the remote device by graphically representing the term data objects in the first term set and the term data objects in the second term set as term nodes and the concept data objects in the concept set as concept nodes.

20. The data processing system of claim 19 wherein an association between a term data object and a concept data object is graphically represented on the visual representation by a line connecting the term node representing the term data object, and the concept node representing the concept data object.

21. The data processing system of claim 20 wherein the term nodes corresponding to the term data objects in the first term set are visually distinctive from the term nodes corresponding to the term data objects in the second term set.

22. The data processing system of claim 21 wherein the term nodes corresponding to the term data objects in the first term set are displayed in a first color and the term nodes corresponding to the term data objects in the second term set are a second color.

23. The data processing system of claim 19 wherein the program module is operative for, in response to a user selecting one of the concept nodes in the visual representation, removing the selected concept node and any term nodes representing term data objects associated only with a concept node represented by the selected concept node from the visual representation.

24. The data processing system of claim 19 wherein the program modules is operative for: requesting search results from a search engine and displaying the search results on the remote device in conjunction with the visual representation.

\* \* \* \* \*